(12) United States Patent
Hahne

(10) Patent No.: US 9,187,089 B2
(45) Date of Patent: Nov. 17, 2015

(54) METHOD FOR OPERATING A DRIVER ASSISTANCE SYSTEM AND DRIVER ASSISTANCE SYSTEM

(71) Applicant: GM GLOBAL TECHNOLOGY OPERATIONS LLC, Detroit, MI (US)

(72) Inventor: Uwe Hahne, Buettelborn (DE)

(73) Assignee: GM Global Technology Operations LLC, Detroit, MI (US)

(*) Notice: Subject to any disclaimer, the term of this patent is extended or adjusted under 35 U.S.C. 154(b) by 249 days.

(21) Appl. No.: 13/716,042

(22) Filed: Dec. 14, 2012

(65) Prior Publication Data

US 2013/0158810 A1  Jun. 20, 2013

(30) Foreign Application Priority Data

Dec. 15, 2011 (DE) .......................... 10 2011 121 277

(51) Int. Cl.
| | |
|---|---|
| *B60W 30/00* | (2006.01) |
| *B60W 30/02* | (2012.01) |
| *B60W 10/18* | (2012.01) |
| *B60W 10/20* | (2006.01) |
| *B60W 10/06* | (2006.01) |
| *B60T 8/17* | (2006.01) |
| *B60W 30/04* | (2006.01) |

(52) U.S. Cl.
CPC ............. *B60W 30/02* (2013.01); *B60T 8/1708* (2013.01); *B60W 10/06* (2013.01); *B60W 10/18* (2013.01); *B60W 10/20* (2013.01); *B60T 2230/06* (2013.01); *B60W 2030/043* (2013.01); *B60W 2520/22* (2013.01)

(58) Field of Classification Search
CPC ............ B60G 17/0195; B60R 16/0315; B60T 8/1755; B60W 10/06; B60W 10/20
USPC ...................... 280/81.6, 426, 93.504; 37/305; 180/9.36
See application file for complete search history.

(56) References Cited

U.S. PATENT DOCUMENTS 4,232,910 A * 11/1980 Snyder .......................... 303/123
5,411,322 A * 5/1995 Breen ............................... 303/7
(Continued)

FOREIGN PATENT DOCUMENTS

| | | |
|---|---|---|
| DE | 19964048 A1 | 1/2001 |
| DE | 10007526 A1 | 9/2001 |
| DE | 102007052759 A1 | 5/2009 |

OTHER PUBLICATIONS

German Patent Office, Search Report for German Application No. 102011121277.2, dated Sep. 27, 2012.

*Primary Examiner* — Helal A Algahaim
*Assistant Examiner* — Jelani Smith
(74) *Attorney, Agent, or Firm* — Ingrassia Fisher & Lorenz PC

(57) ABSTRACT

A method for operating a driver assistance system of a vehicle combination is provided. The vehicle combination includes a tractor vehicle and at least one trailer, and the driver assistance system is designed to automatically actuate at least one element of the vehicle combination. The method comprises the following: At least a first parameter characterizing a potentially unstable driving condition of the trailer is detected. A determination is made as to whether an unstable driving condition of the trailer is imminent. If it is determined that an unstable driving condition of the trailer is imminent, a calculation is made of a position of the trailer and the at least one element is automatically actuated at a point in time when the trailer is positioned in the longitudinal direction of the tractor vehicle and directly in line behind the tractor vehicle.

17 Claims, 6 Drawing Sheets

(56) References Cited

U.S. PATENT DOCUMENTS

| | | |
|---|---|---|
| 6,600,974 B1 | 7/2003 | Traechtler |
| 2005/0206229 A1* | 9/2005 | Lu et al. ............ 303/123 |
| 2006/0155457 A1* | 7/2006 | Waldbauer et al. ............ 701/72 |
| 2008/0262784 A1* | 10/2008 | Massoni et al. ............ 702/138 |
| 2009/0125182 A1 | 5/2009 | Hoetzer et al. |

* cited by examiner

METHOD FOR OPERATING A DRIVER ASSISTANCE SYSTEM AND DRIVER ASSISTANCE SYSTEM

CROSS-REFERENCE TO RELATED APPLICATION

This application claims priority to German Patent Application No. 10 2011 121 277.2, filed Dec. 15, 2011, which is incorporated herein by reference in its entirety.

TECHNICAL FIELD

The application relates to a method for operating a driver assistance system for a vehicle combination, a driver assistance system for a vehicle combination, a computer software product and a computer-readable medium.

BACKGROUND

A driver assistance system for vehicle combinations with a tractor vehicle and at least one trailer is known from DE 10 2007 052 759 A1. The driver assistance system has a sensor device for detecting the dynamics of the trailer, an electronic evaluation device for evaluating the data from the sensor device, and an output device for outputting an instability signal indicating a situation of dynamic instability of the trailer detected by the evaluation unit, and at least one assistance function that under certain circumstances automatically initiates and controls a braking operation. The assistance function is designed to limit the rate at which the vehicle is decelerated during the braking operation to a value that is dependent on the instability signal.

Therefore it may be desirable to provide a method for operating a driver assistance system of a vehicle combination, a driver assistance system for a vehicle combination, a computer software product and a computer-readable medium that enable the implementation of a further improved braking operation of the vehicle combination. In addition, other objects, desirable features and characteristics will become apparent from the subsequent summary and detailed description, and the appended claims, taken in conjunction with the accompanying drawings and this background.

SUMMARY

According to one of various aspects of the application, a method for operating a driver assistance system of a vehicle combination in which the vehicle combination includes a tractor vehicle and at least one trailer, and in which the driver assistance system is designed to automatically actuate at least one element of the vehicle combination selected from the group including a braking device, a drive device and a warning device, comprises the following. At least a first parameter characterizing a potentially unstable driving condition of the at least one trailer is detected. Then a calculation is made as to whether an unstable driving condition of the at least one trailer is imminent based on the at least one calculated first parameter. If it is determined that an unstable driving condition of the at least one trailer is imminent, a calculation is made of at least one second parameter characterizing a position of the at least one trailer. In addition, the at least one element is actuated in such manner that a braking operation of the vehicle combination is initiated at a point in time when the at least one trailer is positioned longitudinally and directly in line behind the tractor vehicle.

The method according to the exemplary embodiment described enables the execution of a further improved braking operation of the vehicle combination. This is performed by detection of the least one second parameter characterizing a position of the at least one trailer if it is determined that an unstable driving condition of the at least one trailer is imminent, and the automatic actuation of the at least one element in such manner that the braking operation is initiated at a point in time when the at least one trailer is positioned longitudinally and directly in line behind the tractor vehicle. Initiation of the braking operation at this point in time advantageously enables interference with the tractor vehicle by the braking operation to be minimized. In this way, accidents involving the vehicle combination due to unstable driving conditions of the at least one trailer may be avoided to a yet greater extent. This results in improved safety in traffic of vehicle combinations.

In one exemplary embodiment of the method, the at least one first parameter characterizes a swinging motion and/or a tipping motion of the at least one trailer. These motion types are particularly important with regard to a potentially unstable driving condition of the trailer and thus also of the vehicle combination as a whole. In this way, the determination in the exemplary embodiment as to whether an unstable driving situation is imminent may be executed in an improved manner.

The determination of the at least one first and/or the at least one second parameter may include the determination of a distance between at least one point on the rear of the tractor vehicle and at least one point on a front side of the at least one trailer. In addition, a chronological record of the distance between at least one point on the rear of the tractor vehicle and at least one point on a front side of the at least one trailer may be calculated.

Here and in the following, the rear side of the tractor vehicle is understood to mean a side of the tractor vehicles facing the at least one trailer. Additionally, the front side of the at least one trailer is understood to mean a side of the trailer facing the tractor vehicle. With the configurations described, a potentially imminent unstable driving condition may be deduced easily, for example if the distance exceeds or falls below a predefined threshold value or the chronological progression of the distance indicates that the at least one trailer is executing a swinging motion. The position of the at least one trailer relative to the tractor vehicle may also be determined with the highest possible degree of accuracy by calculating said distance.

In this context, the at least one first and/or the at least one second parameter may be calculated using data from at least one sensor selected from the group including an electromagnetic sensor, for example, a radar sensor or a lidar sensor, an acoustic sensor, for example, an ultrasonic sensor, and an optical camera. The sensors listed, which are also referred to as environmental sensors, are being fitted more and more often in tractor vehicles, which means that the number of components required for the method may advantageously be reduced.

In another exemplary embodiment of the method, the calculation of the at least one first and/or the at least one second parameter includes the calculation of a current air pressure in at least one tire of the at least one trailer. In addition, a chronological progression of the current air pressure in the at least one tire may be calculated. An imminent unstable driving situation may also be deduced advantageously from a chronological variation in the tire inflation pressure. On the basis of the detected tire pressure it is also possible to determine the point in time when the at least one trailer is located directly behind and longitudinally in line with tractor vehicle.

Additionally or alternatively, the determination of the at least one first and/or of the at least one second parameter may include a calculation of an angle of inclination of the at least one trailer. A chronological progression of the angle of inclination of the at least one trailer may also be calculated. The cited parameters may particularly be used to deduce a rolling or tipping motion of the at least one trailer, that is to say a rotary motion about the longitudinal axis of the trailer, and therewith an imminent unstable driving condition. In this context, the angle of inclination is also designated the roll angle.

In another exemplary embodiment of the method, the calculation of the at least one first and/or the least one second parameter includes a calculation of a frequency and/or amplitude of a swinging motion of the at least one trailer. From the frequency and/or amplitude of the swinging motion, it is also possible in advantageous manner to deduce a potentially imminent unstable driving condition. On the basis of the cited parameters, it is also possible to predict or estimate the point in time when the at least one trailer is located directly behind and longitudinally in line with tractor vehicle.

Additionally, in another exemplary embodiment of the method, a speed of the vehicle combination may be calculated. The calculation of the at least one first parameter and/or the determination as to whether an unstable driving situation of the at least one trailer is imminent are carried out in this variant if the calculated speed exceeds a predetermined threshold value. In this context, consideration was given to the fact that when the vehicle combination is travelling slowly, for example, during parking or shunting maneuvers, the at least one trailer moves out of alignment with the tractor vehicle about a hitching point, but in these situations this does not typically result in an unstable driving condition. Therefore, the driver assistance system is generally not activated, and consequently the calculation of the at least one first parameter and/or the determination as to whether an unstable driving condition of the at least one trailer is imminent is not carried out, until the predetermined threshold value is exceeded.

In another exemplary embodiment, a radius of curvature of a carriageway currently being travelled by the vehicle combination is determined In this exemplary embodiment, the determination as to whether an unstable driving condition of the at least one trailer is imminent is made on the basis of the at least one calculated first parameter and the calculated radius of curvature. By including the radius of curvature in the calculation, the determination as to whether an unstable driving condition of the at least one trailer is imminent may be made yet more accurately for example, when the vehicle is negotiating bends.

In addition, a steering device of the vehicle combination may also be actuated automatically if it is determined that an unstable driving condition of the at least one trailer is imminent. An automatic steering intervention in conjunction with the initiation of a braking operating may serve to prevent the occurrence of unstable driving conditions more effectively.

The application further relates to a driver assistance system for a vehicle combination, wherein the driver assistance system comprises a first calculation device that is designed to calculate at least a first parameter characterizing a potentially unstable driving condition of at least one trailer of the vehicle combination. The driver assistance system further comprises a second calculation device that is designed to calculate whether an unstable driving condition of the at least one trailer is imminent on the basis of the at least one calculated first parameter. The driver assistance system also comprises a third calculation device that is designed to calculate at least a second parameter defining a position of the at least one trailer. The driver assistance system is also equipped with an actuation device that is designed to automatically actuate at least one element of the vehicle combination selected from the group comprising a braking device, a drive device and a warning device in such manner that a braking operation of the vehicle combination is initiated at a point in time when the at least one trailer is positioned longitudinally and directly in line behind the tractor vehicle if it is determined that an unstable driving condition of the at least one trailer is imminent.

The driver assistance system according to the application has the advantages described previously in the context of the method according to the application, and in order to avoid repetition these will not be listed again at this point.

The first calculation device and/or the third calculation device is/are generally coupled to at least one sensor selected from the group comprising an electromagnetic sensor, particularly a radar sensor or a lidar sensor, and acoustic sensor, particularly an ultrasonic sensor, and optical camera and a pressure sensor.

The actuation device may also be designed to automatically actuate a steering device of the vehicle combination if it is determined that an unstable driving condition of the at least one trailer is imminent.

The application further relates to a device for operating a driver assistance system of a vehicle combination, wherein the vehicle combination comprises a tractor vehicle and at least one trailer, and wherein the driver assistance system is designed to automatically actuate at least one element of the vehicle combination selected from the group comprising a braking device, a drive device and a warning device. The device is equipped with means for calculating at least a first parameter characterizing a potentially unstable driving condition of the least one trailer. The device also has means for determining whether an unstable driving condition of the at least one trailer is imminent, based on the at least one first calculated parameter. The device further has means for calculating a second parameter characterizing a position of the at least one trailer. The device also has means for automatically actuating the at least one element in such manner that a braking operation of the vehicle combination is initiated at a point in time when the at least one trailer is positioned longitudinally and directly in line behind the tractor vehicle.

The application further relates to a computer software product that, when executed on a computing unit of a driver assistance system of a vehicle combination, wherein the vehicle combination has a tractor vehicle and at least one trailer and wherein the driver assistance system is designed to automatically actuate at least one element of the vehicle combination selected from the group comprising a braking device, a drive device and a warning device, instructs the computing unit to carry out the following. The computing unit is instructed to calculate at least one first parameter characterizing a first unstable driving condition of the at least one trailer. The computing unit is also instructed to determine whether an unstable driving condition of the at least one trailer is imminent on the basis of the at least one calculated first parameter. If it is determined that an unstable driving condition of the at least one trailer is imminent, the computing unit is instructed to calculate a second parameter characterizing a position of the at least one trailer, and to automatically actuate the at least one element in such manner that a braking operation of the vehicle combination is initiated at a point in time when the at least one trailer is positioned longitudinally and directly in line behind the tractor vehicle.

The application further relates to a computer-readable medium on which a computer software product according to the exemplary embodiment described is stored.

The computer software product and the computer-readable medium according to the application have the advantages described previously in the context of the method according to the application, and in order to avoid repetition these will not be listed again at this point.

In the exemplary embodiments described in the preceding, the tractor vehicle is for example a passenger vehicle or a truck. Moreover, in the exemplary embodiments described in the preceding the at least one trailer may be equipped with its own braking, drive and/or steering devices. In one example, the at least one trailer may comprise a vehicle drawn behind the tractor vehicle, for example in the case of a towing operation.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
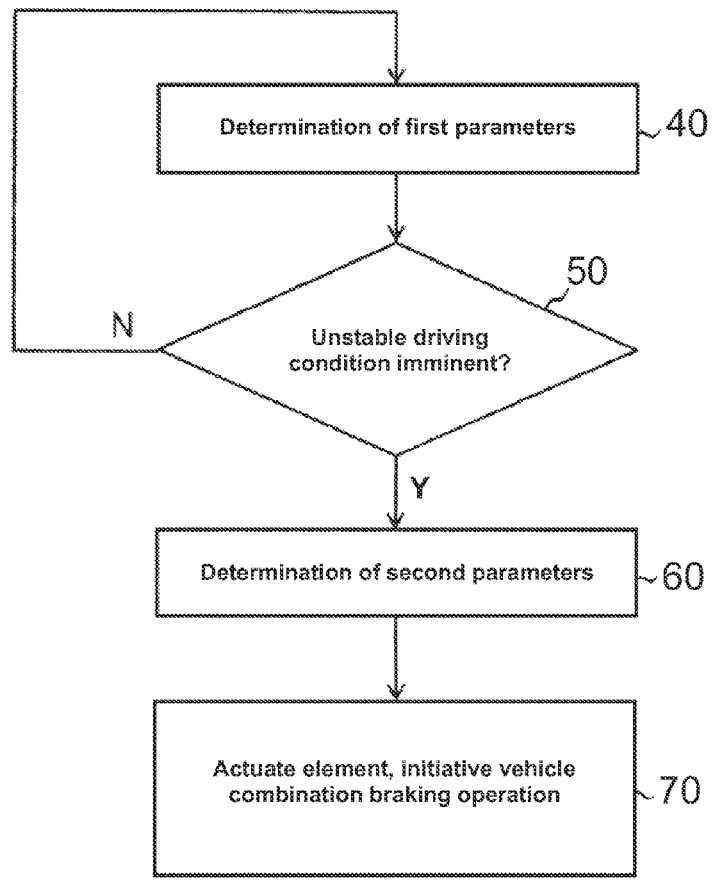
FIG. 1 shows a flowchart of a method for operating a driver assistance system of a vehicle combination according to an exemplary embodiment of the application.

FIG. 1 shows a flowchart of a method for operating a driver assistance system of a vehicle combination according to an exemplary embodiment of the application. The vehicle combination includes a tractor vehicle, for example a passenger vehicle or a truck, and at least one trailer. The driver assistance system is designed to automatically actuate at least one element of the vehicle combination selected from the group comprising a braking device, a drive device and a warning device. Said elements are typically constituent elements of the tractor vehicle. However, it is also possible that the at least one trailer is equipped with its own braking device and/or drive device, which may be automatically actuated via the driver assistance system.

In 40, at least a first parameter characterizing a possible unstable driving condition of the at least one trailer is determined The at least one parameter generally characterizes a swinging and/or tipping motion of the at least one trailer.

The determination of the at least one first parameter may include the calculation of a distance between at least one point on a rear side of the tractor vehicle and at least one point on a front side of the at least one trailer. This may be carried out for example using data from at least one sensor selected from the group comprising an electromagnetic sensor, for example, a radar sensor or a lidar sensor, and an acoustic sensor, for example, an ultrasonic sensor.

The determination of the at least one first parameter may also include the calculation of a current air pressure in at least one tire of the at least one trailer.

The determination of the at least one first parameter may additionally or alternatively include a calculation of an angle of inclination of the at least one trailer.

The determination of the at least one first parameter may further include the calculation of a frequency and/or amplitude of a swinging motion of the at least one trailer.

In 50, it is determined whether an unstable driving condition of the at least one trailer is imminent on the basis of the at least one first calculated parameter.

For example, for this purpose it is determined whether the distance between the at least one point on the rear side of the tractor vehicle and the at least one point on the front side of the at least one trailer is greater or less than a predetermined threshold value. An imminent unstable driving condition may also be deduced if a chronological progression of a distance and/or the tire air pressure particularly indicates a swinging motion of the at least one trailer.

If it is determined in 50 that an unstable driving condition is not imminent, 40 and 50 are carried out again.

On the other hand, if it is determined in 50 that an unstable driving condition of the least one trailer is imminent, in 60 at least a second parameter characterizing a position of the at least one trailer is determined In this context, the at least one second parameter generally characterizes the position of the at least one trailer relative to the tractor vehicle.

The determination of the at least one second parameter may in turn include the calculation of a distance between at least one point on the rear side of the tractor vehicle and at least one point on the front side of the at least one trailer, and/or the calculation of a current air pressure of at least one tire of the at least one trailer.

In 70, automatic actuation of the at least one element is carried out on the basis of the at least one calculated second parameter in such manner that a braking operation of the vehicle combination is initiated at a point in time when the at least one trailer is positioned longitudinally and directly in line behind the tractor vehicle.

The automatic actuation of the at least one element typically takes place at a point in time when the at least one trailer is not yet in directly in line behind the tractor vehicle, in order to take into account system dead times, for example of the braking device or a reaction time of the tractor vehicle driver to a warning message output by the warning device.

In this context, the braking operation of the vehicle combination may be performed by an automatic actuation of the braking device, an automatic actuation of the drive device, for example in the form of a throttling of the engine power delivered, or by the driver of the tractor vehicle after a warning message has been output.

Figure 2:
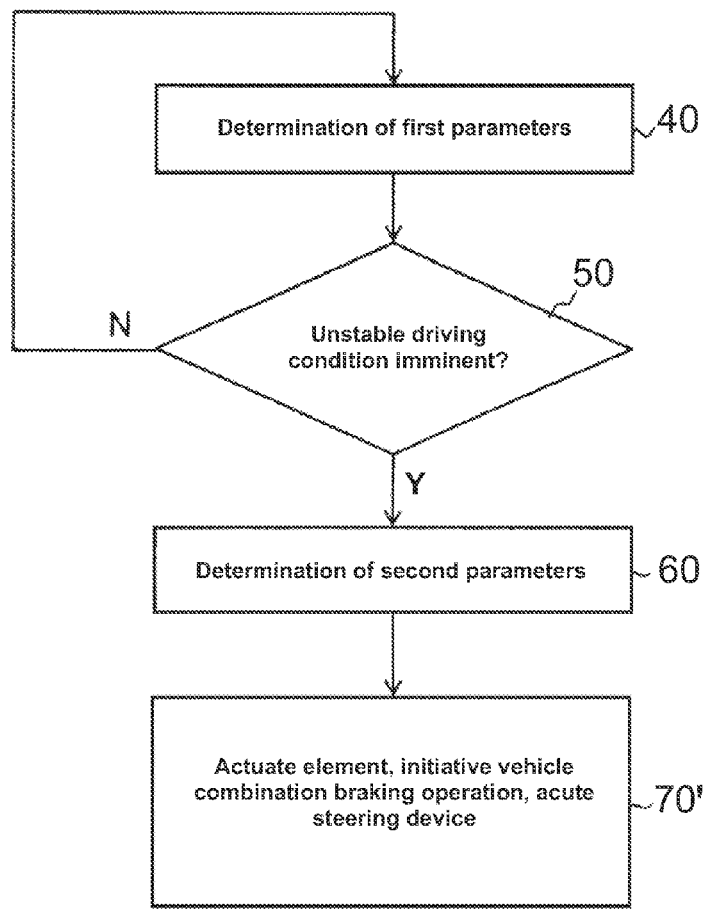
FIG. 2 shows a flowchart of a method for operating a driver assistance system of a vehicle combination according to another exemplary embodiment of the application.

FIG. 2 shows a flowchart of a method for operating a driver assistance system of a vehicle combination according to another exemplary embodiment of the application. The vehicle combination again includes a tractor vehicle and at least one trailer, and the driver assistance system is designed to automatically actuate at least one element of the vehicle combination selected from the group comprising a braking device, a drive device and a warning device.

In 40, at least a first parameter characterizing a potentially unstable driving condition of the at least one trailer is determined, corresponding to 40 of the exemplary embodiment shown in FIG. 1.

In 50, it is determined whether an unstable driving condition of the at least one trailer is imminent on the basis of the at least one first calculated parameter. This is carried out, corresponding to 50 of the exemplary embodiment shown in FIG. 1.

If it is determined in 50 that an unstable driving condition is not imminent, 40 and 50 are carried out again.

On the other hand, if it is determined in 50 that an unstable driving condition of the least one trailer is imminent, in 60 at least a second parameter characterizing a position of the at least one trailer is determined, corresponding to 60 of the exemplary embodiment shown in FIG. 1.

In addition, in 70' automatic actuation of the at least one element is carried out in such manner that a braking operation of the vehicle combination is initiated at a point in time when the at least one trailer is positioned longitudinally and directly in line behind the tractor vehicle. Also in 70' in the exemplary embodiment shown automatic actuation of the steering device of the vehicle combination is carried out. In a further variant, instead of an automatic actuation of the steering device a message may be output to the driver of the tractor vehicle together with an indication of direction in which the vehicle is to be steered.

Figure 3:
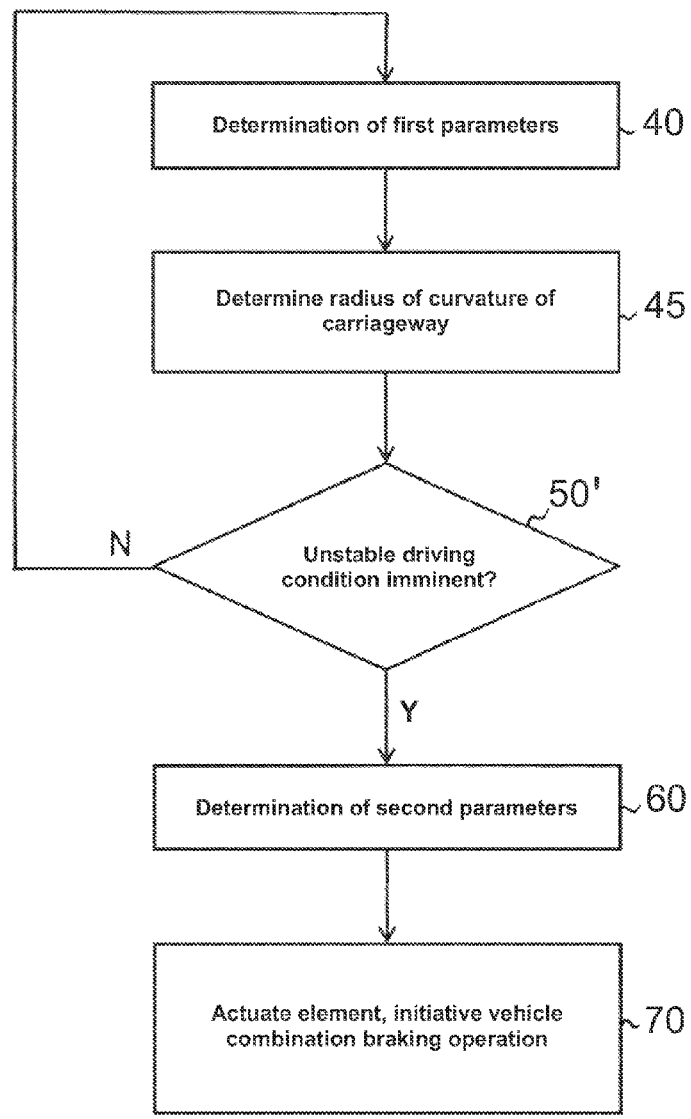
FIG. 3 shows a flowchart of a method for operating a driver assistance system of a vehicle combination according to another exemplary embodiment of the application.

FIG. 3 shows a flowchart of a method for operating a driver assistance system of a vehicle combination according to another exemplary embodiment of the application. The vehicle combination includes a tractor vehicle and at least one trailer, and the driver assistance system is designed to automatically actuate at least one element of the vehicle combination selected from the group comprising a braking device, a drive device and a warning device.

In 40, at least a first parameter characterizing a potentially unstable driving condition of the at least one trailer is determined, corresponding to 40 of the first embodiment shown in FIG. 1.

In addition, in 45 a radius of curvature of a carriageway currently being travelled by the vehicle combination is determined. In this context the radius of curvature may be determined for example via an optical camera. The radius of curvature may also be available from map data, which is stored in a storage device of a navigation system for example.

In 50', it is determined whether an unstable driving condition of the at least one trailer is imminent on the basis of the at least one first calculated parameter.

If it is determined that an unstable driving condition is not imminent, 40, 45 and 50' are repeated.

On the other hand, if it is determined in 50' that an unstable driving condition of the least one trailer is imminent, in 60 at least a second parameter characterizing a position of the at least one trailer is determined, corresponding to 60 of the exemplary embodiment shown in FIG. 1.

In addition, in 70 automatic actuation of the at least one element is carried out in such manner that a braking operation of the vehicle combination is initiated at a point in time when the at least one trailer is positioned longitudinally and directly in line behind the tractor vehicle, corresponding to 70 of the exemplary embodiment shown in FIG. 1.

The exemplary embodiments shown may thus serve to prevent accidents involving vehicles with trailers, for example trucks including tractor vehicles and a trailer, in one example, tanker trucks. These are typically susceptible to tipping over even at relatively slow speeds.

In this context, in one variant a trailer that has become unstable is detected in that the distance between the tractor vehicle and the trailer is measured at the corners thereof with the aid of rearwardly directed ultrasonic sensors. As soon as deviations are detected at these points, this may be indicated to the driver. The point in time when the vehicle should be braked may also be indicated to the driver or to an active braking system. This time is the time when the swinging trailer is briefly travelling directly in line behind the tractor vehicle again.

In a further variation, the swinging of the trailer is calculated also to be the correct point in time for activation of a braking of the vehicle with the aid of a sensor for determining a tilt angle of the trailer, also designated the tilt sensor. This sensor may generally detect a cyclical tilting of the trailer. In this variant also, the time when the vehicle is to be braked is reached when the sensor detects that the trailer is in a central position.

Rolling of the trailer may also be recognized by detecting that tire inflation pressure sensors in the trailer suddenly detect fluctuations in the left and right tires. When the trailer rolls, the center of gravity thereof shifts and differing pressures are created in the tires. In this variant also, the correct point in time for initiating the braking operation is the time when the pressures in the tires are the same again.

In addition, besides rolling of the trailer with tire inflation pressure sensors or a tilt sensor, tilting of the trailer may also be detected and signaled to the driver in the tractor vehicle. In this way, the driver or an automatic steering and braking system may prevent the trailer from overturning.

Figure 4A:
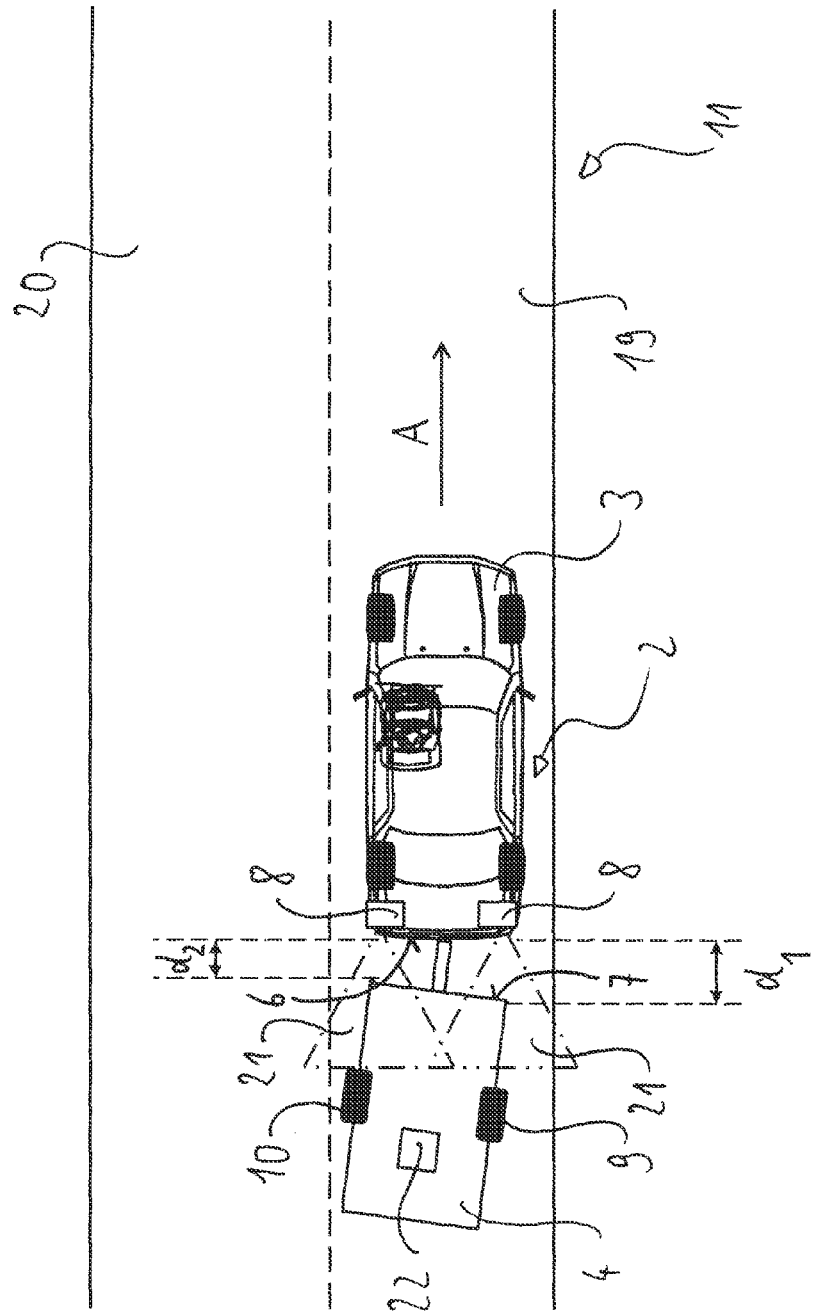
FIGS. 4A and 4B show an example of a traffic situation in which the method according to the application may be used.
Figure 4B:
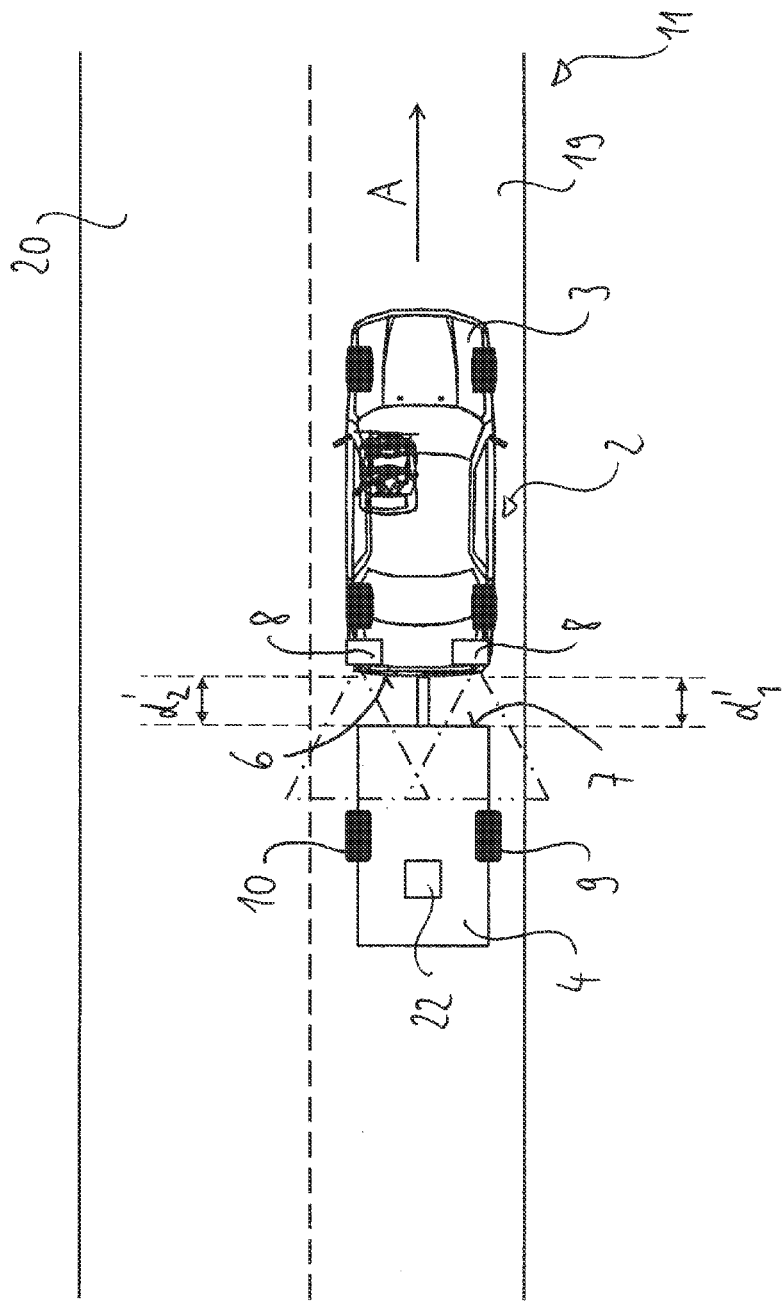

FIGS. 4A and 4B show an example of a traffic situation in which the methods according to the exemplary embodiments of the application, for example, the methods according to the exemplary embodiments shown in FIGS. 1 to 3, may be used. Components with the same functions are identified with the same reference signs in FIGS. 4A and 4B.

FIG. 4A shows the traffic situation at a first point in time and FIG. 4B shows the traffic situation at a second, later point in time.

In the traffic situation shown, a vehicle combination 2, comprising a tractor vehicle 3 and a trailer 4, is travelling in a direction represented schematically by an arrow A in a first lane 19 of a carriageway 11. In this example, tractor vehicle 3 is a passenger vehicle and trailer 4 is constructed as a single-axle trailer. Carriageway 11 comprises a second lane 20 in addition to first carriageway 19.

In the situation shown, tractor vehicle 3 is equipped with two sensors 8, which are arranged on opposite corners of a rear side 6 of tractor vehicle 3. Sensors 8 are generally selected from a group comprising a radar sensor, a lidar sensor and an ultrasonic sensor. In this context, sensors 8 are designed to detect objects within a detection range 21, each represented schematically, wherein detection ranges 21 each comprise and cover at least a partial area of a front side 7 of trailer 4. A distance between two points located on rear side 6 of tractor vehicle 3 and two facing points located on front side 7 of trailer 4 may be calculated using data detected by sensors 8. In the situation shown, the distance between tractor vehicle 3 and trailer 4 is determined at two opposite corners in the transverse direction of the vehicle. Said distances are designated d1 and d2 in FIG. 4A.

At the first point in time shown in FIG. 4A, trailer 4 is executing an amplified swinging motion about an attachment point with tractor vehicle 3. Accordingly, in the situation shown, an unstable driving condition of trailer 4 is imminent.

The existence of a swinging motion may be determined in one example, on the basis of calculated distances d1 and d2. For example, a swinging motion may be deduced from fluctuations in these distances.

A potentially imminent unstable driving condition of trailer 4 may also be deduced on the basis of tire inflation values of tires 9 and 10 of trailer 4, not shown in greater detail in FIG. 4A, and/or on the basis of data captured by a sensor 22, which is arranged in the area of trailer 4 and is designed to determine a tilt angle of trailer 4.

If it is determined on the basis of said parameters that an unstable driving condition of trailer 4 is imminent, at least one second parameter characterizing a position of trailer 4 is calculated. This also may be carried out using data from sensors 8 and/or from sensor 22 as well as on the basis of determined inflation pressure values of tires 9 and 10 of trailer 4. For example, the distances between tractor vehicle 3 and trailer 4 at the corners thereof are determined. These distances are designated d1' and d2' in FIG. 4B.

At least one element of vehicle combination 2, not shown in greater detail, but selected from the group comprising a braking device, a drive device and a warning device, is also actuated automatically in such manner that a braking operation of vehicle combination 2 is initiated at a point in time shown in FIG. 4B, at which trailer 4 is positioned is positioned longitudinally behind tractor vehicle 3 and directly in line behind tractor vehicle 3. At this point in time, distances d1' and d2' are equal to one another. Additional details will be explained in greater detail in conjunction with the following figure.

Figure 5:
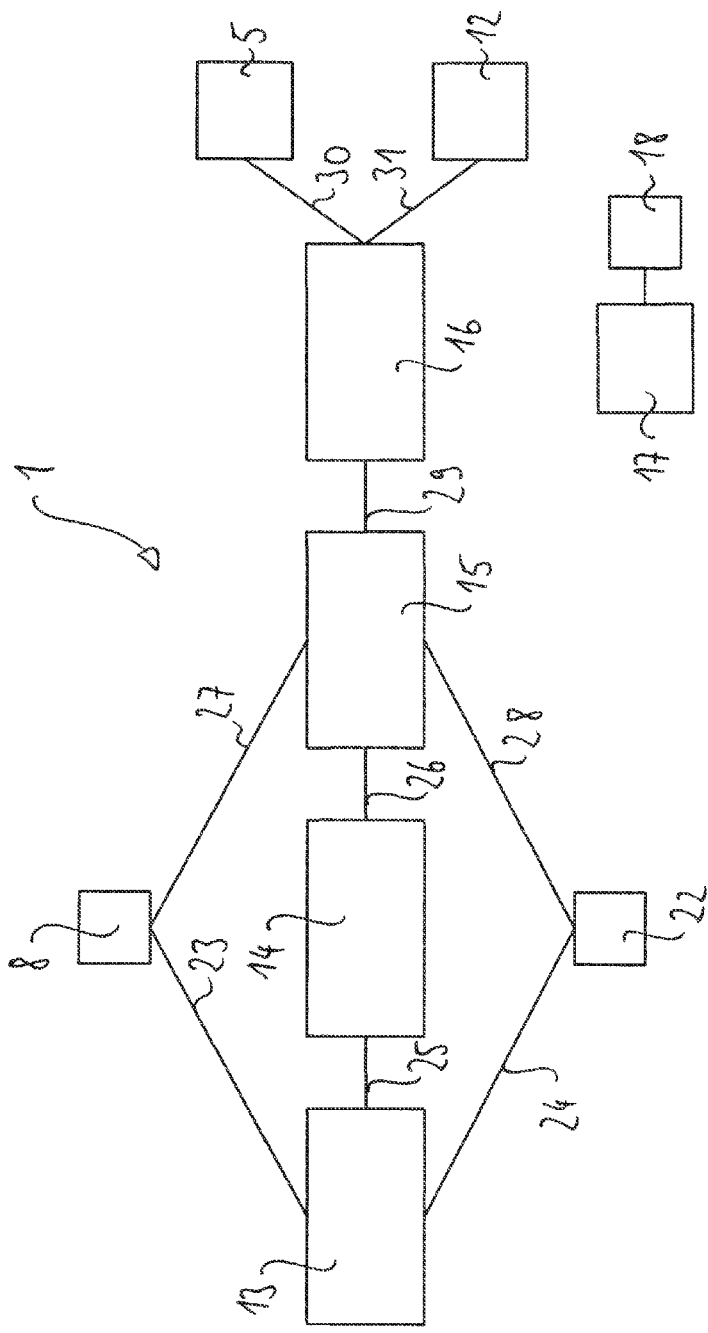
FIG. 5 shows a driver assistance system for a vehicle combination according to an exemplary embodiment of the application.

To this end, FIG. 5 shows a driver assistance system 1 according to an exemplary embodiment of the application for a vehicle combination not shown in FIG. 5. Components having the same functions as in FIGS. 4A and 4B are identified with the same reference signs, and will not be described again in the following.

Driver assistance system 1 is equipped with a first calculation device 13 that is designed to calculate at least a first parameter characterizing a potentially unstable driving condition of at least one trailer of the vehicle combination. To this end, in the exemplary embodiment shown first calculation device 13 is connected to sensors 8, of which for the sake of clarity only one sensor 8 is represented in FIG. 5, via a signal wire 23. First calculation device 13 is also connected to sensor 22 via a wireless operative connection 24, which sensor is designed to determine a tilt angle of the trailer.

Driver assistance system 1 is also equipped with a second calculation device 14, which is designed to determine whether an unstable driving condition of the trailer is imminent on the basis of the at least one first calculated parameter. For this purpose, second calculation device 14 is connected to first calculation device 13 via a signal wire 25.

Driver assistance system 1 is further equipped with a third calculation device 15, that is designed to calculate at least a second parameter characterizing a position of the at least one trailer. Third calculation device 15 is connected to second calculation device 14 via a signal wire 26 and to sensors 8 via a signal wire 27 as well as to sensor 22 via a wireless operative connection 28.

Driver assistance system 1 also comprises an actuation device 16 that is designed to automatically actuate at least one element 5 of a vehicle combination selected from the group comprising a braking device, a drive device and a warning device in such manner that a braking operation of the vehicle combination is initiated at a point in time when the at least one trailer is located in the longitudinal direction of the tractor vehicle of the vehicle combination and directly in line behind the tractor vehicle if it is determined that an unstable driving condition of the at least one trailer is imminent. To this end, actuation device 16 is connected to third calculation device 15 via a signal wire 29 and to the at least one element 5 via a signal wire 30.

In the exemplary embodiment shown, actuation device 16 is designed to automatically actuate a steering device 12 of the vehicle combination if it is determined that an unstable driving condition of the at least one trailer is imminent. To this end, actuation device 16 is connected to steering device 12 via signal wire 31.

In the exemplary embodiment shown, the at least one element 5, that is to say the braking and/or drive and or warning device, and steering device 12 are components of the tractor vehicle of the vehicle combination.

In the exemplary embodiment shown, driver assistance system 1 further comprises a computing unit 17 and a computer-readable medium 18, wherein a computer software product is stored on computer-readable medium 18, which software product, when it runs on computing unit 17, instructs computing unit 17 to carry out the method described in association with the exemplary embodiments of the application, in one example, the method of the exemplary embodiments shown in FIGS. 1 to 3, by means of the elements identified therein. To this end, computing unit 17 is connected to the corresponding elements directly or indirectly, in manner not shown in greater detail.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for operating a driver assistance system of a vehicle combination that comprises a tractor vehicle and at least one trailer, and the driver assistance system is designed to automatically actuate at least one element of the vehicle combination, the method comprising:
   determining at least a first parameter characterizing a potentially unstable driving condition of the at least one trailer;
   determining whether an unstable driving condition of the at least one trailer is imminent based on the at least one calculated first parameter; and
   determining at least one second parameter characterizing a position of the at least one trailer, when it is determined that an unstable driving condition of the at least one trailer is imminent, and automatically actuating at least one element selected from the group comprising a braking device, a drive device and a warning device in such manner that a braking operation of the vehicle combination is initiated when the at least one trailer is positioned directly in line behind the tractor vehicle in the longitudinal direction of the tractor vehicle.

2. The method according to claim 1, wherein the at least one first parameter characterizes at least one of a swinging motion and a tilting motion of the at least one trailer.

3. The method according to claim 1, wherein the determination of at least one of the at least one first parameter and the at least one second parameter further comprises:
calculating a distance between at least one point on a rear side of the tractor vehicle and at least one point on a front side of the at least one trailer.

4. The method according to claim 1, wherein the determination of at least one of the at least one first parameter and the at least one second parameter is made on the basis of data from at least one sensor selected from the group comprising: an electromagnetic sensor, an acoustic sensor and an optical camera.

5. The method according to claim 1, wherein the determination of at least one of the at least one first parameter and the at least one second parameter further comprises:
determining an inflation pressure of at least one tire of the at least one trailer.

6. The method according to claim 1, wherein the determination of at least one of the at least one first parameter and the at least one second parameter further comprises:
determining an angle of inclination of the at least one trailer.

7. The method according to claim 1, wherein the determination of at least one of the at least one first parameter and the at least one second parameter further comprises:
determining at least one of a frequency and an amplitude of a swinging motion of the at least one trailer.

8. The method according to claim 1, further comprising:
calculating a speed of the vehicle combination,
wherein at least one of the at least one first parameter is determined and a determination is made as to whether an unstable driving condition of the at least one trailer is imminent if the calculated speed exceeds a predetermined threshold value.

9. The method according to claim 1, wherein a radius of curvature of a carriageway currently being travelled by the vehicle combination is also determined, and wherein the determination as to whether an unstable driving condition of the at least one trailer is imminent is made on the basis of the at least one calculated first parameter and the determined radius of curvature.

10. The method according to claim 1, further comprising:
automatically actuating a steering device of the vehicle combination if it is determined that an unstable driving condition of the at least one trailer is imminent.

11. A driver assistance system for a vehicle combination, comprising:
a first calculation device that determines at least a first parameter characterizing a potentially unstable driving condition of at least one trailer of the vehicle combination;
a second calculation device that determines whether an unstable driving condition of the at least one trailer is imminent, based on the at least one determined first parameter;
a third calculation device that determines at least a second parameter characterizing a position of the at least one trailer; and
an actuation device that automatically actuates at least one element of the vehicle combination, selected from the group comprising a braking device, a drive device and a warning device in such manner that a braking operation of the vehicle combination is initiated when the at least one trailer is positioned directly in line behind a tractor vehicle in the longitudinal direction of the tractor vehicle of the vehicle combination when it is determined that an unstable driving condition of the at least one trailer is imminent.

12. The driver assistance system according to claim 11, wherein at least one of the first calculation device and the third calculation device is coupled with a sensor selected from the group comprising an electromagnetic sensor, an acoustic sensor, optical camera and a pressure sensor.

13. The driver assistance system according to claim 11, wherein the actuation device automatically actuates a steering device of the vehicle combination, if it is determined that an unstable driving condition of the at least one trailer is imminent.

14. A computer software product, comprising:
a storage medium readable by a computing unit of a driver assistance system of a vehicle combination, the vehicle combination including a tractor vehicle and at least one trailer, and the driver assistance system is designed to automatically actuate at least one element of the vehicle combination selected from the group comprising a braking device, a drive device and a warning device, and the storage medium stores instructions for the computing unit to carry out a method comprising:
determining at least a first parameter characterizing a potentially unstable driving condition of the at least one trailer;
determining whether an unstable driving condition of the at least one trailer is imminent based on the at least one calculated first parameter and
determining at least one second parameter characterizing a position of the at least one trailer, when it is determined that an unstable driving condition of the at least one trailer is imminent, and automatically actuating the at least one element in such manner that a braking operation of the vehicle combination is initiated when the at least one trailer is positioned directly in line behind the tractor vehicle in the longitudinal direction of the tractor vehicle.

15. The computer software product according to claim 14, wherein the determination of at least one of the at least one first parameter and the at least one second parameter further comprises:
determining an inflation pressure of at least one tire of the at least one trailer.

16. The computer software product according to claim 14, wherein the determination of at least one of the at least one first parameter and the at least one second parameter further comprises:
determining an angle of inclination of the at least one trailer.

17. The computer software product according to claim 14, wherein the determination of at least one of the at least one first parameter and the at least one second parameter further comprises:
determining at least one of a frequency and an amplitude of a singing motion of the at least one trailer.

* * * * *